Patented May 5, 1925.

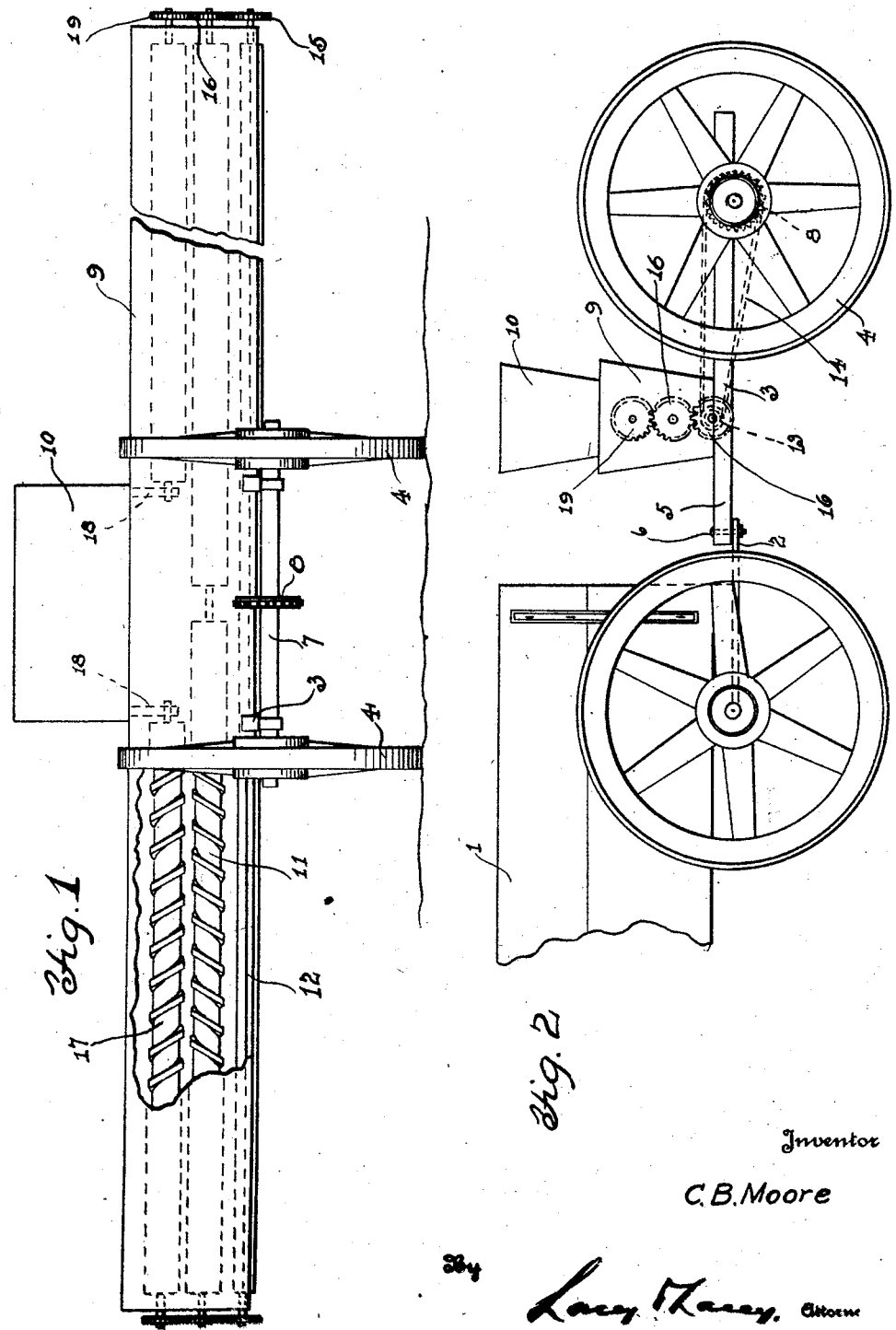

1,536,962

UNITED STATES PATENT OFFICE.

CHARLES B. MOORE, OF MATTOON, ILLINOIS.

SEED PLANTER.

Application filed April 9, 1924. Serial No. 705,401.

*To all whom it may concern:*

Be it known that I, CHARLES B. MOORE, a citizen of the United States, residing at Mattoon, in the county of Coles and State of Illinois, have invented certain new and useful Improvements in Seed Planters, of which the following is a specification.

My invention relates to seed-planting mechanism and seeks to provide an apparatus which may be easily coupled to the rear of a wagon or other vehicle and automatically operated as the wagon or other vehicle is drawn over a field to plant seed for any desired crop. The invention provides means for evenly distributing seed over a wide area and avoids costly and complicated mechanisms which are apt to get out of order. The invention is illustrated in the accompanying drawing and will be hereinafter fully set forth.

In the drawing:

Figure 1 is a rear elevation, partly broken away, of a planting mechanism embodying my improvements, and Fig. 2 is an end elevation of the same.

In the drawing, the reference numeral 1 indicates a portion of an ordinary farm wagon which is provided at its rear end with a coupling or drawbar 2 extending rearwardly from its axle. In carrying out my invention, I employ a frame 3 which is supported upon ground wheels 4 and is equipped with a stub tongue 5 adapted to be coupled to the drawbar 2 by a pin or similar device 6. The ground wheels 4 are fixed upon the axle 7 so that the axle will be rotated as the device is drawn over the field, and at the center of the said axle a sprocket wheel 8 is secured thereto to provide means for imparting motion to the seed-dropping shaft.

Upon the frame 3, I secure in any convenient or preferred manner a distributing hopper 9 which may extend laterally to any desired extent so that the seed distributed therefrom will be spread over a wide area. Upon the top of the hopper 9, I secure a receiving hopper 10 which may be easily filled from the vehicle 1, as will be readily understood. Within the hopper 9, I provide the augers or feeding worms 11 which are so disposed as to effect travel of the seed toward the ends of the hopper in opposite directions from the center thereof, and immediately below these augers or feeding worms I provide in the hopper a dropping shaft 12 which may be of any preferred construction and is provided at its center with a sprocket pinion 13, a sprocket chain 14 being trained around the said pinion and the sprocket 8 so as to impart motion to the dropping shaft. The dropping shaft is reduced at its ends to be easily fitted in the bearings provided therefor and its fits closely but rotatably in a slot in the bottom of the hopper 9, the walls of the slot being parallel to the axis of the shaft which is provided with longitudinal grooves or with circumferential series of pockets to permit the seed to pass from the hopper in a thin stream to fall upon the ground. The arrangement, construction and operation of the dropping shaft, however, are well-known and the specific form employed is not essential to my invention. The ends of the distributing shaft 12 are extended through and have bearing in the ends of the hopper and are equipped at their extremities with pinions 15 meshing with pinions 16 on the ends of the distributing augers 11 so that motion will be imparted directly to the augers. Above the distributing augers or worms 11, I mount in the hopper 9 evener augers or worms 17 which have their inner ends spaced apart and supported by bearings, indicated at 18, of any convenient or preferred form. The outer ends of the evener augers 17 are equipped with pinions 19 meshing with the pinions 16 so that the said evener augers or worms will be rotated simultaneously with the augers 11 but in the opposite direction.

In operation, the seed to be planted is fed into the hopper 10 and will at once gravitate into the distributing hopper 9 at the center of the same, accumulating around the inner ends of the distributing worms or augers 11. As the device is then drawn over the field, the dropping shaft and the augers will be rotated so that the seed will be fed from the center of the distributing hopper toward the ends of the same, and should the seed be fed toward the ends of the hopper too rapidly so that it would tend to accumulate and choke the operation of the distributing augers, the evener augers 17 will engage with the body of seed and feed the upper portions thereof back toward the center of the hopper so that an even distribution will be effected.

My seed-planting attachment is exceedingly simple and compact and may be easily coupled to any farm wagon or other vehicle, requiring no change in the vehicle except the addition thereto of a drawbar, such as indicated conventionally at 2. While the device is intended primarily for planting seed, it may be very advantageously employed to distribute lime or other fertilizer.

Having thus described the invention, I claim:

An apparatus for the purpose set forth comprising a frame, an axle and wheels supporting the frame, a stub tongue projecting from the front side of the frame at the center thereof, means for detachably coupling the tongue to the rear end of a vehicle, a distributing hopper secured transversely upon the frame and extending laterally beyond the sides of the same, a receiving hopper mounted centrally upon the distributing hopper, a dropping shaft extending laterally from the frame in the bottom of the distributing hopper, distributing augers mounted in the distributing hopper immediately above the dropping shaft and parallel therewith, evener augers mounted in the lateral portions of the distributing hopper immediately above the distributing augers, trains of gearing connecting the ends of the dropping shaft with the outer ends of said augers, and gearing connecting the dropping shaft with the frame-supporting wheels.

In testimony whereof I affix my signature.

CHARLES B. MOORE. [L. S.]